United States Patent [19]

DuLac

[11] Patent Number: 4,935,868
[45] Date of Patent: Jun. 19, 1990

[54] MULTIPLE PORT BUS INTERFACE CONTROLLER WITH SLAVE BUS

[75] Inventor: Keith B. DuLac, Derby, Kans.

[73] Assignee: NCR Corporation, Dayton, Ohio

[21] Appl. No.: 276,602

[22] Filed: Nov. 28, 1988

[51] Int. Cl.⁵ .............................................. G06F 3/00
[52] U.S. Cl. ................................ 364/200; 364/232.8;
    364/239; 364/228.3; 364/241.9; 364/240.8;
    364/240.9
[58] Field of Search .......................... 364/200, 300, 900

[56] References Cited

U.S. PATENT DOCUMENTS

| | | | |
|---|---|---|---|
| 3,740,728 | 6/1973 | Pullen | 340/172.5 |
| 4,245,305 | 1/1981 | Cechele et al. | 364/200 |
| 4,246,637 | 1/1981 | Brown et al. | 364/200 |
| 4,291,370 | 9/1981 | Charles | 364/200 |
| 4,417,304 | 11/1983 | Dinwiddie, Jr. | 364/200 |
| 4,511,969 | 4/1985 | Koenig et al. | 364/200 |
| 4,514,808 | 4/1985 | Murayama et al. | 364/200 |
| 4,538,224 | 8/1985 | peterson | 364/200 |
| 4,648,068 | 3/1987 | Ninnemann et al. | 364/900 |
| 4,654,778 | 3/1987 | Chiesa et al. | 364/200 |
| 4,665,483 | 5/1987 | Ciacci et al. | 364/200 |
| 4,837,677 | 6/1989 | Burrus, Jr. et al. | 364/200 |

Primary Examiner—Raulfe B. Zache
Attorney, Agent, or Firm—Wilbert Hawk, Jr.; Stephen F. Jewett; Jack R. Penrod

[57] ABSTRACT

A new integrated circuit for interfacing a standard IEEE 796 bus to a VSB-type buffer bus. This integrated circuit includes a DMA channel for high speed access of the IEEE 796 bus to the buffer bus, and a slave bus channel for high speed access of the buffer bus to the IEEE 796 bus. A third bus interface connects to a local processor to assist in arbitration and control during some types of data transfers.

20 Claims, 2 Drawing Sheets

MULTIPLE PORT BUS INTERFACE CONTROLLER WITH SLAVE BUS

Background of the Invention

The present invention relates to a controller for controlling the interconnection between two dissimilar buses within an electronic data system, and more particularly between a buffer bus, which multiplexes addresses and data over the same lines, and an IEEE 796 bus, which is a standard of the Institute of Electrical and Electronic Engineers, Inc., New York, NY, having separate buses for addresses and data.

A large number of the commercial thirty-two bit processor designs use bus architectures which transfer address words and data words in a time division multiplexed arrangement over a common parallel bus. This type of bus architecture operates effectively with devices where the address information must precede the resulting data information by approximately one clock cycle. Buffers and random access memories are just two examples of such devices.

One specific multiplexed bus architecture that is often used is the VSB parallel subsystem bus which was developed by Motorola, Incorporated. A specification entitled THE PARALLEL SUB SYSTEM OF THE IEC 821 BUS, published November, 1986 for the VSB parallel subsystem bus is currently under consideration for standardization by the International Electrotechnical Commission, which specification is hereby incorporated by reference.

This VSB bus was developed for high speed transfers of both address information and data information in systems with hierarchical memory. To control the transfer of the address words and the data words, a control bus is included as part of the overall address and data multiplexed bus architecture. The control bus includes control lines to coordinate a type of master-slave operation, and also coordinate a type of arbitration in case of contention by competing masters for the address and data bus. The buffer bus, that the present invention interfaces with, is a subset of the VSB bus. The main difference between the buffer bus and the VSB bus is a reduction in the number of address and data lines to 24 from the full 32 line version of the VSB specification.

On the other hand, a large number of designs having eight bit, sixteen bit, and even thirty-two bit processors use versions of the IEEE 796 bus architecture. These designs use variations of a IEEE bus architecture which is described in a IEEE-796-1983 specification entitled STANDARD MICROCOMPUTER SYSTEM BUS, published by the IEEE Incorporated in 1983. This specification is hereby incorporated by reference also.

The IEEE 796 architecture uses one parallel bus for address words and a second parallel bus for data words. The IEEE 796 architecture includes data bus versions with eight lines and with sixteen lines. The sixteen line data bus version has, according to the specification, a twenty-four line address bus. The IEEE 796 architecture also includes a control bus to control the transfers across the address and data buses. This control bus includes controls for a type of master-slave operation and for coordinating a type of arbitration among competing masters for the address and the data portions of the bus.

With the growing use of these two competing architectures, there is a need for a circuit which interfaces the buffer bus architecture and the IEEE 796 bus architecture to one another, and allows them to interoperate effectively. An interface circuit that overcomes the inherent incompatibilities by providing the functions necessary for data addressing, data transferring, communication and control sequencing, and others. Further for maximum interoperability, the interface circuit should facilitate the operation of a unit as a master or slave unit on its own bus, and also the operation of this unit as a master or slave with respect to the other bus.

It is an object of this invention to provide an interface circuit for data transfers between a IEEE 796 bus and an address and data multiplexed buffer bus.

It is another object of this invention to provide an interface circuit that allows any master on the address and data multiplexed buffer bus to operate the IEEE 796 bus as a slave.

It is another object of this invention to provide an interface circuit that allows any master on the IEEE 796 bus to operate the interface circuit as a slave unit and access any unit connected to the address and data multiplexed buffer bus.

Summary of the Invention

Briefly stated, in accordance with one aspect of the invention, the foregoing objects are achieved by providing a circuit for use with a microprocessor for interfacing a host processor, which has a plural bus having separate parallel address and data sub-buses, to a unit having an address and data multiplexed buffer bus. The circuit includes a plural bus port device connected to the plural bus of the host processor unit for directing the path of a data signal transferred to the plural bus port, a buffer bus device connected to a buffer bus of another processor unit for directing the path of a data signal transferred to the buffer bus port device, and a data buffer device connected to the plural bus port device via a first data bus and to the buffer bus port device via a second data bus for buffering data transferred between the plural bus port device and the buffer bus device. A port control device is connected to the plural bus port device via a first group of control lines, to the buffer bus port device via a second group of control lines, and to the data buffer device via a third set of control lines. The port control device controls the transfer of data signals between the first data bus and the second data bus. A slave data bus is connected between the plural bus port device and the buffer bus port device. The slave data bus allows the buffer bus and a connected unit, and the plural bus and a connected unit to operate in a master-and-slave relationship while transferring data between the units.

Various objects appear from a reading of the foregoing summary of the invention. Other objects and further scope of applicability of the present invention will appear from the following detailed description. It should be understood that the detailed description indicates one embodiment of the invention and is given by way of illustration only since changes and modifications may be made within the spirit and scope of the invention.

Brief Description of the Drawings

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

Detailed Description of a Preferred Embodiment

Figure 1:
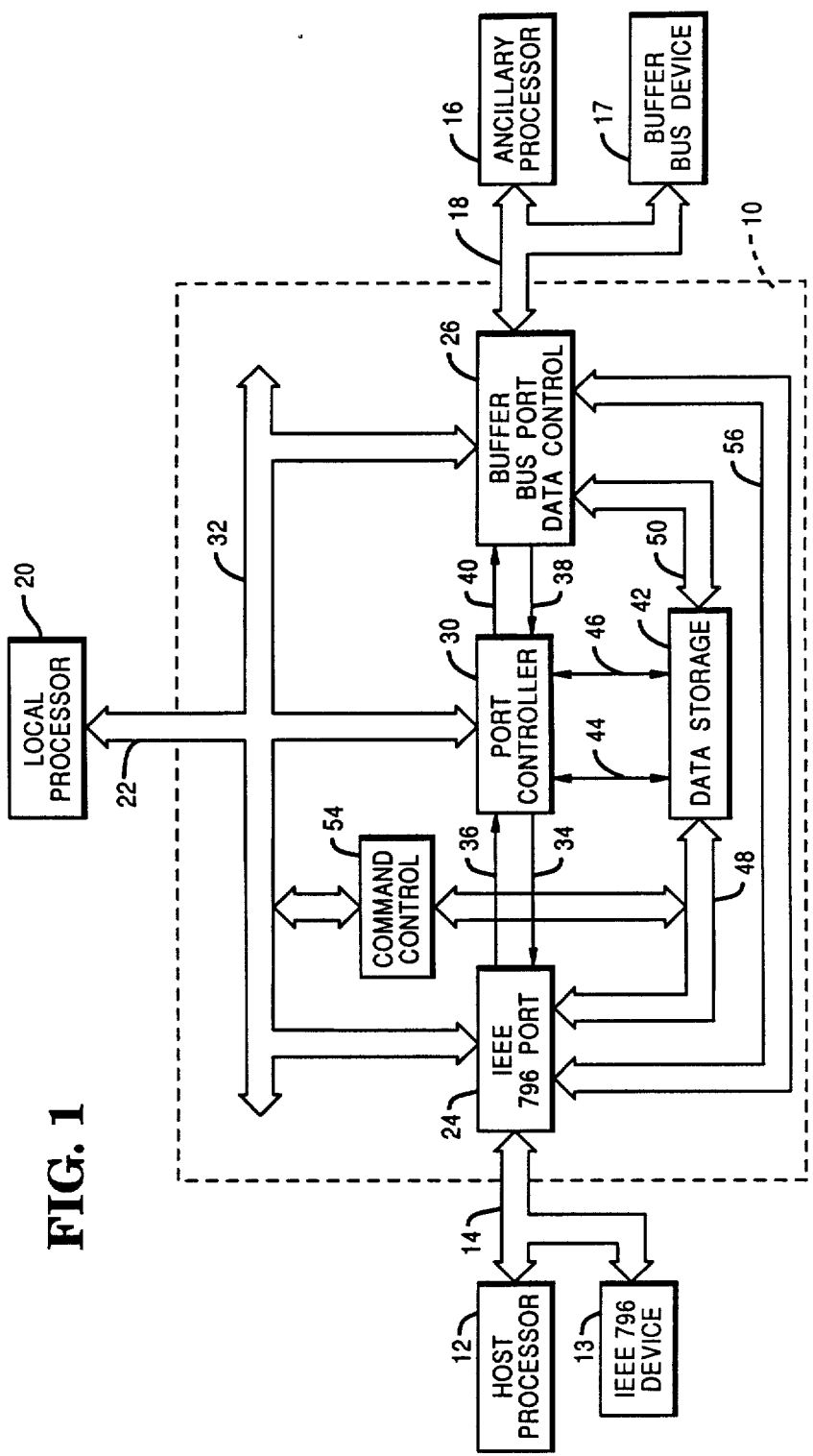
FIG. 1 is a block diagram of one embodiment of the invention.

Referring to FIG. 1, a simplified block diagram of one embodiment of the invention is seen. A multiple port bus interface (MBIF) controller 10 is shown connected to a host processor system 12 by a standard IEEE 796 bus 14, and connected to another ancillary processor 16 by an address and data multiplexed buffer bus 18. A third bus, a local processor bus 22, connects the MBIF controller 10 to a local processor 20, such as a Motorola 68000 or a similar microprocessor. The local processor bus 22 includes an address bus, a data bus, and control lines to interconnect the local processor 20 to the MBIF controller 10.

The standard bus 14 is connected to a IEEE 796 port 24 inside the MBIF controller 10. The IEEE 796 port 24 provides the input and output signal drive and buffering levels described in the IEEE 796 bus standard. Additionally, along with other functional elements of the MBIF controller 10, the IEEE 796 port 24 provides a control point for directing address and data signals inputted on or outputted to the standard bus 14 as explained below.

Similarly, the buffer bus 18 is connected to a buffer bus port 26 inside the MBIF controller 10. The buffer bus port 26 provides a second control point for directing address and data signals inputted on or outputted to the buffer bus 18.

A port controller 30 is connected to the IEEE 796 port 24 and the buffer bus port 26 by an internal processor bus 32. Additionally, the port controller 30 is connected to the IEEE 796 port 24 by a control line 34, over which data requests are made, from the port controller 30 to the IEEE 796 port 24, and a control line 36, over which acknowledgements are made, from the IEEE 796 port 24 to the port controller 30. Similarly, the port controller 30 is connected to the buffer bus port 26 by a control line 38, over which data requests are made, and from the port controller 30 to the buffer bus port 26, and by a control line 40, over which acknowledgements are made, from the buffer bus port 26 to the port controller 30.

The port controller 30 is also connected to a data storage unit 42, which may be any of a number of storage devices known in the art such as a controlled FIFO RAM or a group of rotating buffers. Two control buses 44, 46 connect the port controller 30 to the data storage unit 42. These control buses 44, 46 will be explained below.

The data storage unit 42 is connected to the IEEE 796 port 24 by a data bus 48, which is bidirectional to facilitate transfer of data in either the READ or WRITE mode between the IEEE port 796 and the data storage unit 42. The data storage unit 42 is also connected to the buffer bus port 26 by a data bus 50, which is bidirectional to facilitate transfer of data either in the READ or WRITE mode between the buffer bus port 26 and the data storage unit 42.

The IEEE 796 port 24, the buffer bus port 26, the port controller 30, and the data storage unit 42 use the internal processor bus 32, the various control lines 34, 36, 38, 40, and control buses 44, 46 to coordinate the transfer of data through data bus 48 and data bus 50. In this manner, the MBIF controller 10 forms a type of direct memory access (DMA) channel which is controlled by the host processor 12 between the buffer bus 18, which has common multiplexed address and data lines, and the IEEE 796 bus 14, which has a separate address sub-bus and a data sub-bus.

The host processor 12 can instruct the MBIF controller 10 to operate in one of two DMA modes. The two DMA modes of operation are an auto-incrementing mode and a stationary mode.

The auto-incrementing DMA transfer mode is used to transfer data between the buffer bus 18 and any responding unit residing thereon, such as the ancillary processor 16 or buffer bus device 17; and the IEEE 796 bus 14 and any unit residing thereon, such as host processor 12 or IEEE 796 device 13. When operating in the auto-incrementing mode under the control of any unit connected to the IEEE 796 bus 14, the MBIF controller 10 becomes a temporary master of the bus 14 (assuming, of course, that any arbitration according to the provisions of IEEE 796 has been processed by the local processor 20). As an IEEE 796 master the MBIF controller 10 can perform READ or WRITE cycles transferring data from the buffer bus 18 to the memory address space or the I/O address space of the IEEE 796 bus 14. At the completion of each READ or WRITE cycle, an address counter, which is a part of the port controller 30, is automatically incremented to provide a next address in the sequence of the DMA transfer. At the end of this DMA transfer, the MBIF controller 10 relinquishes its master status.

The stationary DMA transfer mode is used to transfer data between the buffer bus 18 and the I/O address space of the IEEE 796 bus 14. Because of this, the program of the host processor 12, or any other device operating as a master on the IEEE 796 bus 14, should only perform input/output instructions that are compatible with IEEE 796 input/output instruction protocol when the stationary mode is selected. For DMA WRITE transfers from the buffer bus 18 to the IEEE 796 bus 14, the MBIF controller 10 is instructed to be a master of the IEEE 796 bus 14 and control the transfer from the buffer bus 18 until the WRITE cycle is completed. Additionally, for DMA WRITE transfers from the IEEE 796 bus 14 to the buffer bus 18, the MBIF controller 10 is instructed by the host 12, or any other IEEE 796 master device such as IEEE 796 device 13, to operate as an IEEE 796 slave unit and accept the data written across bus 14 for presentation on the buffer bus 18.

During all of the DMA transfers, the port controller 30 is requesting and acknowledging data transfers through either the IEEE 796 port 24 or the buffer data port 26 depending on the type of DMA operation. The initial setup of the port controller 30 is performed by the local processor 20 over the local processor bus 22 and the connecting internal processor bus 32.

Figure 2:
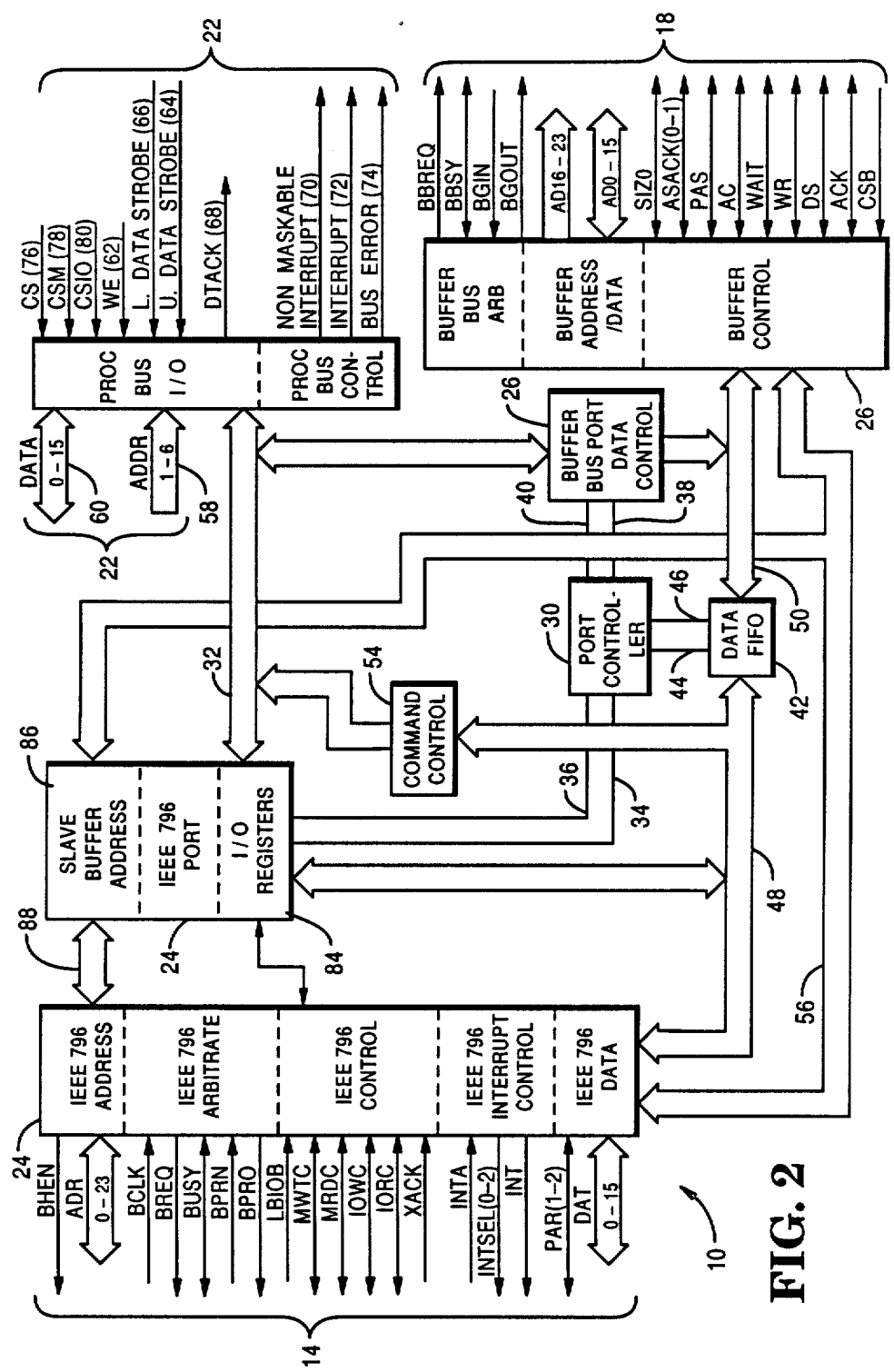
FIG. 2 is more detailed block diagram of the embodiment shown in FIG. 1.

Referring now to FIG. 2, the internal processor bus 32 is comprised of thirty-three lines for various signals. Address bus 58 is made up of six of the thirty-three lines. Only six address lines are required because of the relatively small address space of the registers and memories within the MBIF controller 10. In operation, the address bus 58 may address any of the memory mapped registers that are part of the port controller 30, the IEEE 796 port 24, and the buffer bus port 26. Upon being addressed, the local processor 20 may WRITE or READ data into the addressed register. Data is transferred to or from the memory mapped registers that are part of the port controller 30, the IEEE 796 port 24 or the buffer bus port 26 by a bidirectional, sixteen bit data bus 60. A WRITE ENABLE (WE) line 62 works in conjunction with an upper data strobe line 64 and a lower data strobe line 66. If a WRITE signal is asserted on WE line 62, the present data bus cycle is defined as a WRITE operation, and if a WRITE signal is not asserted, the present data cycle is defined as a READ cycle. Data to/from DATA 8–15 lines of data bus 60 are strobed by the local processor 20 onto corresponding lines of processor bus 22 by upper data strobe line 64, and data to/from lines DATA 0–7 are similarly strobed by lower data strobe line 66 onto corresponding lines of processor bus 22. Data transfer acknowledge (DTACK) line 68 is driven by the MBIF 10 to acknowledge to local processor 20 that the current WRITE or READ data transfer cycle has been completed.

Error control of the MBIF controller 10 is managed by a non-maskable interrupt line 70, an interrupt line 72, and a bus error line 74 of the internal processor bus 32. The non-maskable interrupt line 70 is driven whenever one of the internal data components reaches a limit condition, such as an overflow condition of data storage 42 or a timeout condition of a timer in port controller 30. When a limit condition is reached, non-maskable interrupt line 70 signals to the local processor 20 that immediate action is required. The interrupt line 72 is driven to indicate to the local processor 20 that a maskable interrupt is pending signifying an occurrence of a non-urgent event such as a IEEE 796 bus 14 interrupt, a IEEE 796 bus 14 host attention data signal, or a data transfer complete signal from port controller 30. The bus error line 74 when driven by the MBIF controller 10 indicates to the local processor 20 that a non-recoverable error has occurred within the MBIF controller 10 and the current operation should either be retried, or some sort of error diagnosis initiated.

The internal processor bus 32 has three chip select lines: chip select (CS) 76, chip select-memory (CSM) 78, and chip select input/output (CSIO) 80. The CS line 76 is driven by the local processor 20 when the local processor 20 READ and/or WRITE accesses to any of the registers within the MBIF controller 10. Setting up the I/O Registers 84 (see FIG. 2) prior to a DMA access to the MBIF controller 10 is one example of the use of CS 76. CSM 78 is driven by the local processor 20 to indicate that the current access from the IEEE 796 bus 14 is an access to/from the memory address space of the host processor 12. Similarly, CSIO 80 is driven by the local processor 20 to indicate that the current access from the IEEE 796 bus 14 is an access to/from the I/O address space of the host processor 12.

The local processor 20 is preferably a Motorola type 68000 microprocessor, and the local processor bus 22 is a subset of a 68000 microprocessor bus. Instructions for the local processor 20 are supplied thereto by the host processor 12 via the IEEE 796 bus 14, the IEEE 796 port 24, the DMA bus 48, and the command/control storage unit 54; and/or by an external bus (not shown) connected from the IEEE 796 bus 14 to the local processor 20.

After any required setup by the local processor 20, the port controller 30 controls the flow of data into and out of the data storage unit 42. The port controller 30 controls the transfer of data into or out of the buffer bus port side of the storage unit 42 according to the data transfer protocol of the data bus 50 and the buffer bus 18. Similarly, the port controller 30 controls the transfer of data out of or into the IEEE 796 port side of the data storage unit 42 according to the data transfer protocol of the data bus 48 and the IEEE 796 bus 14. The storage unit 42 acts as a time and protocol buffer for the DMA address and data information and, thereby, allows the two ports 24, 26 to act independently. Should the port controller 30 find a contention for either the IEEE 796 bus 14 or the buffer bus 18, it instructs the local processor 20 via command/control storage unit 54 and internal processor bus 32 to perform any required arbitration until the arbitrated-for bus 14 or 18 is acquired. Such arbitration methods are well known in the art and will not be further discussed here.

In order to perform any operation, the host processor 12 may load a series of commands via buses 14 and 32 into the command/control storage unit 54, which may include a FIFO or similar set of registers. These commands are thereafter READ one at a time by local processor 20 and interpreted into instructions which are transferred to and performed within the port controller 30 by a portion thereof as will be explained below.

The description thus far has considered the MBIF controller 10 to be a controlled unit of the host 12 and the IEEE 796 bus 14; however, one of the outstanding features of this invention is the ability of the MBIF controller 10 through the operation of slave bus 56 to act equally as well as a controlled unit of the buffer bus 18. Thus, the discussion will now describe the preferred embodiment as a controlled unit of the buffer bus 18 and any units attached thereto such as ancillary processor 16.

The buffer bus 18 has twenty-four address lines AD0-AD23 to transfer address information to and from the MBIF controller 10 during any address phase of the buffer bus 18. The buffer bus 18 multiplexes sixteen lines AD0-AD15 of these twenty-four for the task of transferring data information to and from the MBIF controller 10 during any data phase of the buffer bus 18. As shown in FIG. 2, the buffer bus 18 has four control lines which are used for buffer bus arbitration, and ten lines which are used for control of information to and from the buffer port 26. The designation and operation of these lines is as described in the VSB specification mentioned previously. When a master on the buffer bus 18, such as ancillary processor 16 (not shown in FIG. 2), asserts the CSB control line by driving it to a low level, a slave mode is initiated in which the MBIF controller 10 may be operated as a slave with respect to the buffer bus 18. After this slave mode is initiated, the current buffer bus master may directly access the IEEE 796 bus via the buffer port control 26, the slave bus 56, and the IEEE 796 port 24. The slave bus 56 is connected to an internal twenty-four bit slave buffer address register 86 which stores a twenty-four bit address during the address phase of the buffer bus 18. The address that is latched into the slave buffer address register 86 is connected to the IEEE 796 port 24 via bus 88. The IEEE 796 port 24 broadcasts this slave buffer address without address offset translation onto the IEEE 796 bus 14 to identify the unit of the IEEE 796 bus 14 that is the object of the current buffer bus READ/WRITE operation. Any arbitration for current control of the IEEE 796 bus 14 is performed automatically by the MBIF 10 after the CSB line is driven low.

While in the buffer bus slave mode, a buffer bus master may perform read or write transfers to the memory space reserved for the IEEE 796 host processor 12 (see FIG. 1). Block transfers may also be performed in the buffer bus slave mode. During block transfers, the address register, which is part of I/O Control Registers 84, is automatically incremented after each sixteen bit word of the block is transferred. Care should be exercised to store a word count in a buffer bus word count register in the I/O Control Registers 84 that is equal to or greater than the number of words to be actually transferred in order to prevent a potential deadlock between the MBIF Controller 10 and the current master of the buffer bus 18. At the end of the transfer, the CSB line is no longer driven low by the buffer bus master and the buffer bus slave mode is completed.

Thus, it will now be understood that there has been disclosed a multiple port bus interface controller, which provides a high speed DMA access channel from a IEEE 796 bus master to a address-and-data multiplexed bus slave, and a high speed direct access channel from an address and data multiplexed bus master to a IEEE 796 slave. These two channels, with the assistance of the remainder of the multiple port bus interface controller, make high speed data transactions possible from either one of the connected buses to the other connected bus.

While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. An electronic apparatus for interfacing a plural bus that connects to a host processor unit and a plural bus unit, said plural bus having separate parallel address and data sub-buses, to a buffer bus that connects to an additional processor and a buffer bus unit, comprising:
   plural bus port means connected to said plural bus for directing a path of data transferred to said plural bus port means;
   buffer bus port means connected to said buffer bus of said additional processor unit for directing a path of data transferred to said buffer bus port means;
   data buffer means connected to said plural bus port means via a first data bus and to said buffer bus port means via a second data bus for buffering data transferred between said plural bus port means and said buffer bus port means via said first and second data buses;
   port control means connected to said plural bus port means via a first group of control lines, to said buffer bus port means via a second group of control lines, and to said data buffer means via a third set of control lines for controlling each transfer of data between said first data bus and said second data bus; and
   slave data bus means connected between said plural bus port means and said buffer bus port means for operating said buffer bus and said buffer bus unit, and said plural bus and said plural bus unit as a master-and-slave combination to transfer data therebetween.

2. The electronic apparatus of claim 1, further comprising a microprocessor connected to said electronic apparatus via a microprocessor bus for setting up said port control means before said transfer of data from said first data bus and said second data bus.

3. The electronic apparatus of claim 2, wherein said data is in a form of data words having eight data bits therein.

4. The electronic apparatus of claim 3, wherein said electronic apparatus is a single integrated circuit chip.

5. The electronic apparatus of claim 1, wherein said buffer bus unit and said additional processor unit are the same unit.

6. The electronic apparatus of claim 1, wherein said plural bus unit and said host processor unit are the same unit.

7. The electronic apparatus of claim 1, wherein said plural bus is an IEEE 796 buss.

8. The electronic apparatus of claim 7, wherein said buffer bus is a time division multiplexed bus having address information and data information transferred over common bus lines during different time division multiplex cycles.

9. The electronic apparatus of claim 1, wherein said data buffer means stores a digital data bit.

10. An electronic apparatus for interfacing a host processor unit having a plural bus connected thereto having separate parallel address and data sub-buses to a buffer bus unit having a buffer bus connected thereto, comprising:
    plural bus port means connected to said plural bus for directing a path of data transferred to said plural bus data port means;
    buffer bus port means connected to an additional processor unit via said buffer bus for directing a path of data transferred to said buffer bus port means;
    data buffer means connected to said plural bus port means via a first data bus and to said buffer bus port means via a second data bus for buffering data transferred between said plural bus port means and said buffer bus port means;
    port control means connected to said plural bus port means via a first group of control lines, to said buffer bus port means via a second group of control lines, and to said data buffer means via a third set of control lines for controlling a transfer of data between said first data bus and said second data bus; and
    slave data bus means connected between said plural bus port means and said buffer bus port means for operating said plural bus and said host processor unit connected thereto as a slave unit of said buffer bus and said buffer bus unit connected thereto as a master unit to transfer data between said master unit and said slave unit.

11. The electronic apparatus of claim 10, further comprising a microprocessor connected to said electronic apparatus via a microprocessor bus for setting up said port control means before said transfer of data from said first data bus and said second data bus.

12. The electronic apparatus of claim 11, wherein said data is in a form of data words having eight data bits therein.

13. The electronic apparatus of claim 12, wherein said electronic apparatus is a single integrated circuit chip.

14. The electronic apparatus of claim 10, wherein said buffer bus unit and said additional processor unit are the same unit.

15. The electronic apparatus of claim 10, wherein said data buffer means stores a digital data bit.

16. An electronic apparatus for interfacing a host processor unit having a plural bus having separate parallel address and data sub-buses to a buffer bus unit having a buffer bus, comprising:
- plural bus port means connected to the plural bus of the host processor unit for directing a path of data transferred to said plural bus port means;
- buffer bus port means connected to an additional processor unit via said buffer bus for directing a path of data transferred to said buffer bus port means;
- data buffer means connected to said plural bus port means via a first data bus and to said buffer bus port means via a second data bus for buffering data transferred between said plural bus port means and said buffer bus port means;
- port control means connected to said plural bus port means via a first group of control lines, to said buffer bus port means via a second group of control lines, and to said data buffer means via a third set of control lines for controlling the transfer of data between said first data bus and said second data bus; and
- slave data bus means connected between said plural bus port means and said buffer bus port means for operating said buffer bus and said buffer bus unit connected thereto as a slave unit of said plural bus and a plural bus unit connected thereto as a master unit to transfer data between said master unit and said slave unit.

17. The electronic apparatus of claim 16, further comprising a microprocessor connected to said electronic apparatus via a microprocessor bus for setting up said port control means before said transfer of data from said first data bus and said second data bus.

18. The electronic apparatus of claim 17, wherein said data is in a form of data words having eight data bits therein.

19. The electronic apparatus of claim 18, wherein said electronic apparatus is a single integrated circuit chip.

20. The electronic apparatus of claim 16, wherein said buffer bus unit and said additional processor unit are the same unit.

* * * * *